United States Patent
Aoyama

[11] Patent Number: 5,361,141
[45] Date of Patent: Nov. 1, 1994

[54] IMAGE PROCESSOR

[75] Inventor: Teruyuki Aoyama, Kanagawa, Japan

[73] Assignee: Fuji Xerox Co., Ltd., Tokyo, Japan

[21] Appl. No.: 858,577

[22] Filed: Mar. 27, 1992

[30] Foreign Application Priority Data

Mar. 28, 1991 [JP] Japan .................. 3-064440

[51] Int. Cl.$^5$ .......................................... H04N 1/387
[52] U.S. Cl. ................................ 358/452; 358/450; 358/537; 358/453
[58] Field of Search ............ 358/452, 448, 453, 450, 358/76, 80, 75, 524, 527, 537, 538, 540, 903; 395/145, 146, 157; 364/419

[56] References Cited

U.S. PATENT DOCUMENTS

| | | | |
|---|---|---|---|
| 3,997,912 | 12/1976 | Zsagar | 358/903 |
| 4,189,744 | 2/1980 | Stern | 358/903 |
| 4,200,867 | 4/1980 | Hill | 358/903 |
| 4,524,421 | 6/1985 | Searby et al. | 358/903 |
| 4,760,458 | 7/1988 | Watanabe et al. | 358/452 |
| 4,931,957 | 6/1990 | Takagi et al. | 395/145 |
| 5,162,918 | 11/1992 | Muramatsu | 358/452 |

FOREIGN PATENT DOCUMENTS

| | | |
|---|---|---|
| 63-236063 | 9/1988 | Japan . |
| 64-28786 | 1/1989 | Japan . |
| 2-223275 | 9/1990 | Japan . |

*Primary Examiner*—Edward L. Coles, Sr.
*Assistant Examiner*—Fan Lee
*Attorney, Agent, or Firm*—Finnegan, Henderson, Farabow, Garrett & Dunner

[57] ABSTRACT

An image processor having an edit function and outputting image data obtained by reading a document after subjecting the image data to an edit process includes an image processing unit for subjecting image data obtained by reading a document to an edit process and outputting edited image data, an input unit for inputting an edit instruction to the image processing unit, a position developing unit for developing a position of the edit instruction inputted by the input unit, and a first display unit for displaying the position of the edit instruction developed by the position developing unit with a mark at a position corresponding to an edit-instructed area.

7 Claims, 8 Drawing Sheets

(MONOCHROMATIC DOCUMENT)

(BIT MAP DISPLAY)

(CHARACTER DISPLAY)

(BIT MAP DISPLAY)  (CHARACTER DISPLAY)

FIG. 3(g)

(BIT MAP DISPLAY)  (CHARACTER DISPLAY)

IMAGE PROCESSOR

BACKGROUND OF THE INVENTION

The invention relates to an image processor which has edit functions and subjects image data obtained by reading a document to edit processes to output the edited image data.

A digital copying machine includes an image input terminal (IIT) for reading a document, an image processing system (IPS) for processing the read image data, and an image output terminal (IOT) for outputting copies while driving, e.g., a laser printer, in accordance with the image data. The image input terminal extracts image data of the document as an analog electric signal corresponding to a reflectance of light using a CCD (charge-coupled device) sensor and converts this electric signal to multi-tone digital image data. The image processing system processes the image data obtained by the image input terminal so that various correcting, converting, and edit operations are performed, while the image output terminal outputs a dotted image by turning on and off a laser of the laser printer in accordance with the image data processed in the image processing system.

Such a digital copying machine produces images in accordance with the type of multi-tone image data through the processing of the image processing system. For example, a binary-coded image such as a character is produced as an edge-enhanced sharp image; a halftone image such as a photograph is outputted as a smooth image; and definition-adjusted, highly reproducible color images can also be outputted. The machine can also produce images that are painted, color-converted, trimmed, shifted, synthesized, reduced, enlarged, and subjected to other edit processes with respect to a document. With respect to the image processing system, the image input terminal reads a document in the form of signals obtained by color-separating the document into the three primary colors, R (red), G (green), and B (blue) and outputs the read image data, while the image output terminal prepares dotted toner images, each corresponding to Y (yellow), M (magenta), C (cyan), or K (black) and outputs these toner images superimposed one upon the other to produce a color image.

Figure 4:
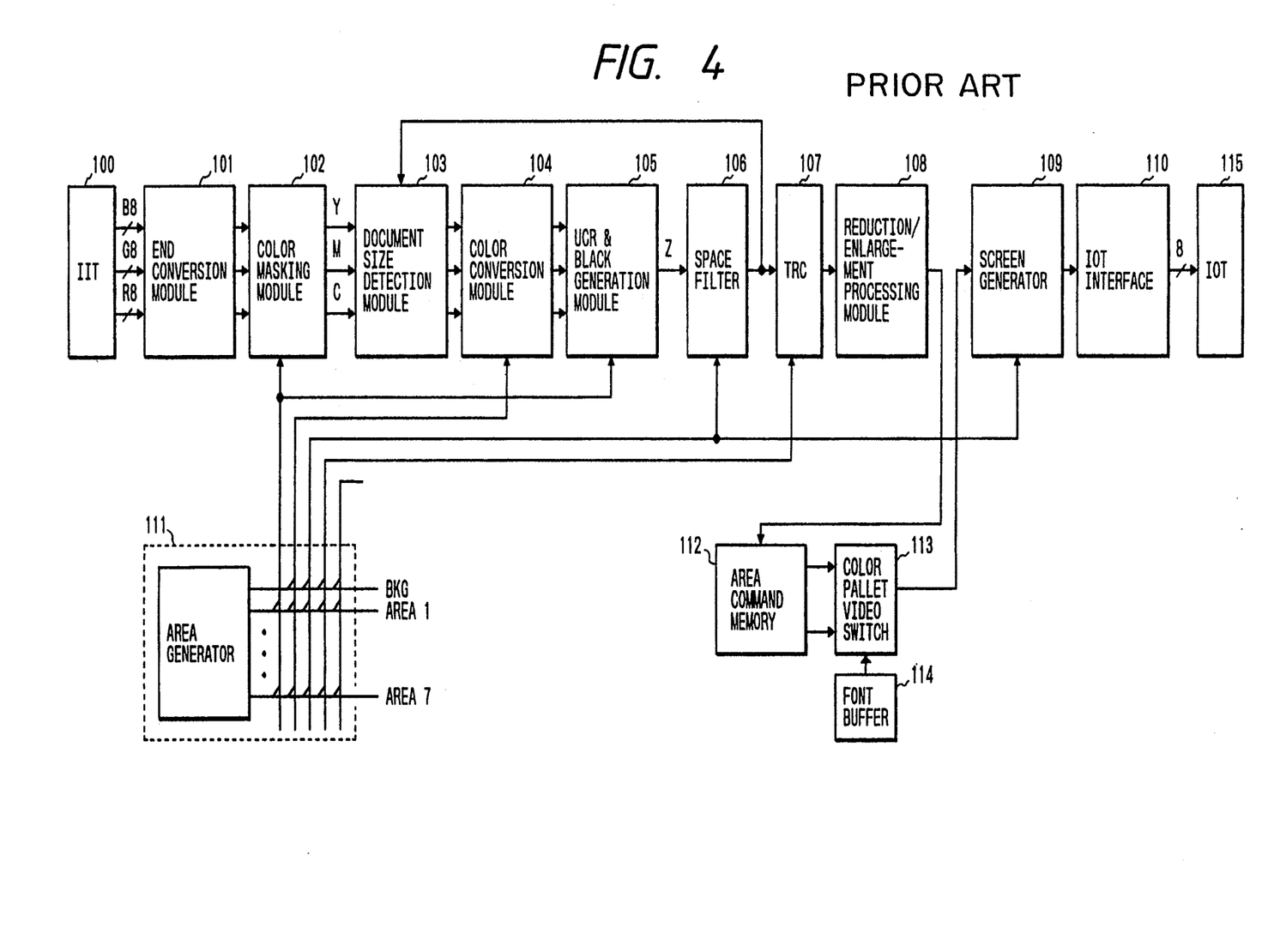
FIG. 4 is a diagram showing an exemplary configuration of a color digital copying machine having conventional edit functions.

An outline of such a color digital copying machine will be described, taking as an example one proposed by the present applicant (e.g., Japanese Patent Unexamined Publication No. Hei. 2-223275). FIG. 4 is a diagram showing an exemplary configuration of a color digital copying machine having conventional edit functions.

In FIG. 4, IIT 100 reads a color document while color-separating it into the three primary colors B, G and R of light using a CCD line sensor and converts the read color document into digital image data; and IOT 115 reproduces the color image by subjecting the image data to an exposing process by a laser beam and to a developing process. Components from equivalent neutral density (END) conversion module 101 to IOT interface 110 interposed between IIT 100 and IOT 115 constitute an image data edit processing system or image processing system (IPS), which converts the image data into Y, M, C, and K to prepare toner signals and outputs to IOT 115 the toner signals, each corresponding to a developing color, every developing cycle.

Further, IIT 100 reads a pixel by the unit of 16 dots/mm for B, G and R using the CCD sensor, and outputs the image data in 24 bits (3 colors × 8 bits; 256 tone levels). The CCD sensor is covered with filters on its upper surface, each filter corresponding to the primary colors B, G and R. The length of the CCD sensor is 300 mm, and the density thereof is 16 dots/mm. Further, the CCD sensor scans 16 lines/mm at a process speed of 190.5 mm/sec, and therefore the CCD sensor outputs the read data at a speed of approximately 15M pixels/sec every color. IIT 100 converts analog data of B, G and R into logarithmic data to thereby convert the reflectance data into density data, and the density data is further converted into digital data.

The IPS receives color-separated signals for B, G and R from IIT 100, subjects the received signals to various kinds of data processing to improve reproducibility in color, tone, and definition, and outputs toner signals of process colors for development to IOT 115 after converted into on/off signals. END conversion module 101 adjusts or converts the received signals into gray-balanced color signals, and color masking module 102 converts B, G and R signals into toner quantity signals, each corresponding to Y, M, or C by subjecting the B, G and R signals to a matrix calculation. Document size detection module 103 detects the size of the document at the time of prescanning and deletes a platen color (frame) during scanning to read the document. Color conversion module 104 converts a color specified in a predetermined area in accordance with an area signal inputted from an area image control module 111. UCR (under color removal) and black generation module 105 not only generates such an appropriate quantity of K as not to cause "turbidity" in color reproduction to reduce the quantities of Y, M and C commensurate with the quantity of K, but also gates the K signal and the under-color-removed Y, M and C signals in accordance with signals in a monochromatic mode and in a full-color mode. Space filter 106 is a nonlinear digital filter having the function of recovering a dull output and removing moires. Tone reproduction control (TRC) module 107 performs such processing as density and contrast adjustments to improve reproducibility, negative/positive inversion, and color balance adjustment. Reduction/enlargement processing module 108 performs reduction/enlargement processing in the main scanning direction. The reduction/enlargement processing in the auxiliary scanning direction is performed by adjusting a scan speed. Screen generator 109 converts a toner signal in process color into an on/off binary-coded toner signal and outputs the binary-coded toner signal. Such binary-coded toner signal is applied to IOT 115 through IOT interface module 110. Area image control module 111 includes an area generating circuit and a switch matrix, while an edit control module includes area command memory 112, color pallet video switch circuit 113, and font buffer 114, and performs various kinds of edit processing.

The area image control module 111 can set 7 rectangular areas and their priority levels in the area generating circuit, and area control data is set in the switch matrix so as to correspond to each area. The control data include: color conversion; color mode such as monochromatic mode or full color mode; modulation select data such as photograph or character; TRC selection data; and screen generator selection data. These data are used to control the color masking module 102, color conversion module 104, UCR module 105, space filter 106, and TRC module 107. In addition, the switch matrix can be set by software.

The edit control module permits paint processing in which a document such as a graph is read and a specified area thereof whose shape is not limited is painted. A 4-bit area command is written to a plane memory consisting of 4 sheets, so that an edit command corresponding to each point of the document can be set using 4 bits provided by the 4 sheets of plane memory.

In the above color digital copying machine, when making an edit instruction such as color conversion, shading, or painting, its edit content is specified from the console panel, while its edit area is specified either from a document placed on a digitizer or from the console panel based on X and Y coordinates. When the area has been inputted and specified, its position is displayed. To make corrections such as enlarging, reducing, or moving the thus specified edit area, a select screen and a correction screen are called.

In correcting an edit area, a plurality of edit areas and an forward/backward movement key are displayed on the select screen, and a selected area is displayed on the screen, e.g., in reverse. As an area has been selected by operating the forward/backward movement key on the select screen in accordance with a specified sequence, the select screen is switched to the correction screen. On the correction screen, a rectangular area and a correction key such as an arrow or a triangular mark are displayed, with the correction key appearing on each side (upper/lower/right/left) of the rectangular area, and a correction is made to enlarge or reduce the rectangular area by 1 mm in the direction of the arrow or the triangular mark, e.g., every time the correction key is operated.

However, when a document is placed on the digitizer and an area is specified therefrom, the above conventional digital copying machine displays only its position on the display. As a result, an edit content corresponding to the specified area cannot be checked, and its accurate positional relationship with the document cannot be checked.

After edit instructions have been given to a plurality of areas, and even if one area to which a color conversion instruction has been specified is to be checked and corrected based on the checking, the select screen does not indicate the correspondence between the edit area and its edit content. For this reason, the operator must memorize the edit content for each area. Further, to check a specific content, he must obtain a printed copy, which produces copies to be wasted.

To overcome such inconvenience, proposed are a system for displaying the relationship between input data and its programmed recording position (e.g., Japanese Patent Unexamined Publication No. Sho. 63-236063), and a system for displaying image data on a screen to set an area and thereby controlling an output color (e.g., Japanese Patent Unexamined Publication No. Sho. 64-28786). However, these systems do not permit the operator to check the positions and contents of other already specified edit data.

SUMMARY OF THE INVENTION

The invention attempts to overcome the above problems. Accordingly, an object of the invention is to allow the areas and contents of a plurality of edit instructions to be checked easily. Another object of the invention is to enable a user to recognize the correspondence between each edit area and its edit content for the plurality of edit instructions.

To achieve the above objects, the invention provides an image processor having an edit function and outputting image data obtained by reading a document after subjecting the image data to an edit process, the image processor including image processing means for subjecting image data obtained by reading a document to an edit process and outputting edited image data, input means for inputting an edit instruction to the image processing means, position developing means for developing a position of the edit instruction inputted by the input means, and first display means for displaying the position of the edit instruction developed by the position developing means with a mark at a position corresponding to an edit-instructed area.

BRIEF DESCRIPTION OF THE DRAWINGS

FIGS. 1 (a) and 1 (b) are diagrams for explaining an embodiment of the image processor according to the invention;

FIGS. 3 (a) through 3 (i) are diagrams for explaining processing performed by the image processor.

DETAILED DESCRIPTION OF THE PREFERRED EMBODIMENT

Figure 1A:
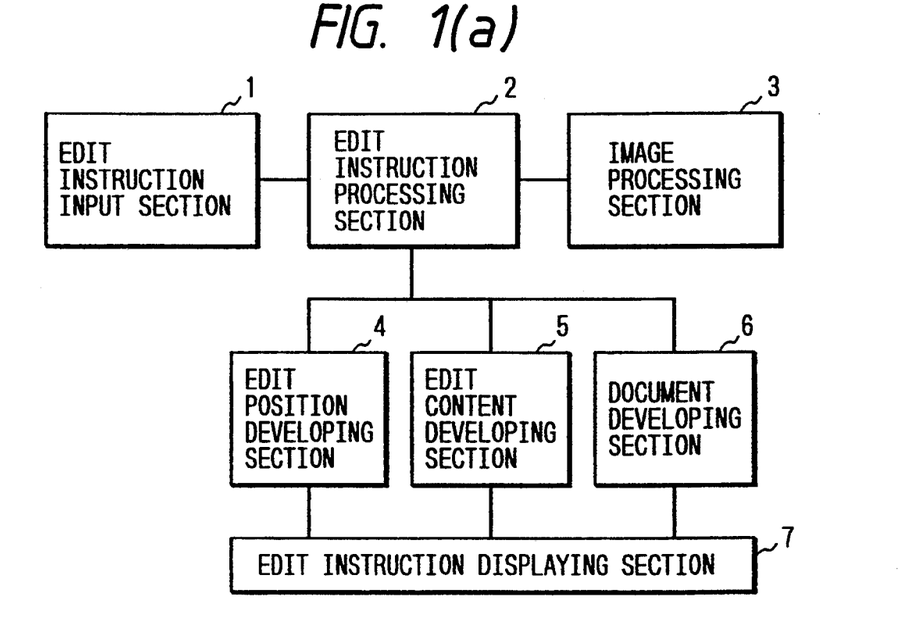
Figure 1B:
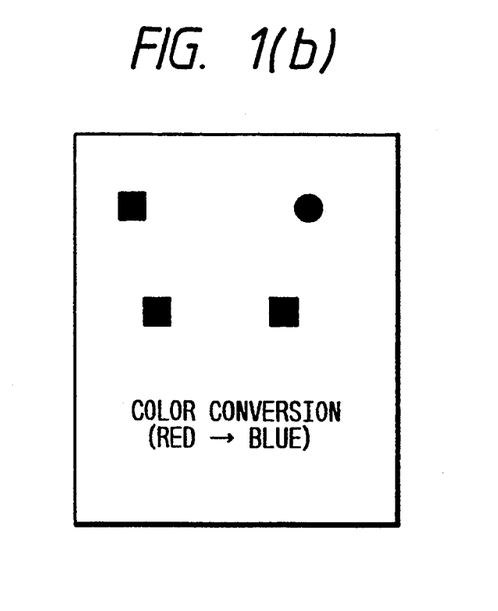

An embodiment of the invention will now be described with reference to the accompanying drawings. FIGS. 1 (a) and 1 (b) are diagrams for explaining the embodiment of the image processor according to the invention, and FIG. 2 is a diagram showing an exemplary general system configuration of the image processor.

In FIG. 1 (a), edit instruction input section 1 not only selectively specifies an edit function such as painting, color conversion, trimming, or rotation using units including an edit pad, a console panel, a keyboard, and a touch panel mounted on a display, but also instructs and inputs its content and corrects its edit area. Edit position developing section 4 develops the inputted edit area into display data, and edit content developing section 5 develops the edit content into display data. Document developing section 6 develops images of a document into display data. Edit instruction displaying section 7 displays the respective developed display data together on a single screen so as to overlap one upon the other. For example, as shown in FIG. 1 (b), the edit instruction displaying section 7 not only displays the edit positions with marks such as ■ and ●, but also displays an edit content corresponding to one of the edit positions at a position different from the instructed edit positions. In this case, the instructed edit positions are displayed, e.g., by way of blinking or in reverse, while the corresponding edit content is erased after the elapse of a predetermined time period. As shown in FIG. 1 (b), if the instructed edit positions are on the upper side of the screen, the edit content is displayed on the lower side of the screen while if the instructed edit positions are on the right side of the screen, the edit content is displayed on the left side of the screen. Thus, the position of displaying the edit content is selected so as not to overlap the instructed edit positions. Edit instruction processing section 2 performs such processing as to read image data of the document from image processing section 3, to develop the read image data by the document developing section 6, and to develop the edit instructions and correcting contents inputted from edit instruction input section 1 by the edit position developing section 4 and the edit content developing section 5. The edit instruction processing section 2 also sets the edit instructions to the image processing section 3. The image processing section 3 is formed of an image processing system, such as a digital copying machine, which is connected to an image input terminal (IIT) and an image output terminal (IOT) and which can perform various edit functions. A general hardware configuration of the image processor is as shown in FIG. 2.

Figure 2:
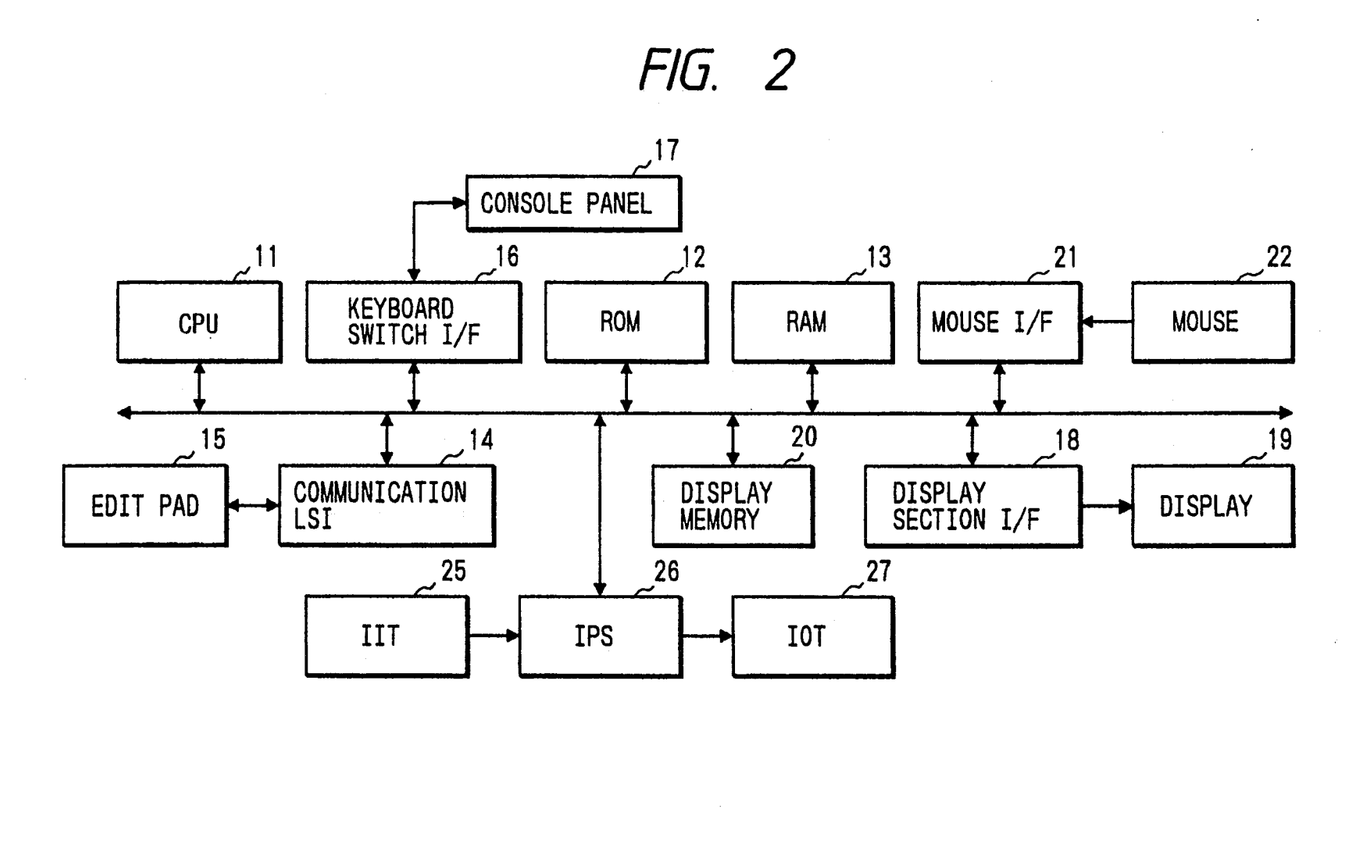
FIG. 2 is a diagram showing an exemplary general system configuration of the image processor.

In FIG. 2, IIT 25 is the image input terminal that reads a document by a CCD sensor; IPS 26 is the image processing system that subjects the image data to edit and other processing; and IOT 27 is the image output terminal that outputs copies by driving, e.g., a laser printer in accordance with the image data. These components constitute the abovementioned conventional digital copying machine.

Edit pad 15 specifies and inputs an edit area to use various edit functions (contents). Console panel 17 is used not only to input data through its keys to select and confirm functions when using the various edit functions, but also to display for confirmation a value or the like using a display (a character display). Display 19 is, e.g., a bit map display that displays documents, edit areas, edit contents, and correcting contents in accordance with the edit areas specified or inputted by the edit pad 15. Display memory 20 develops and stores display data for a document or an edit area which is to be displayed on the display 19. Mouse 22 operates a cursor displayed on the screen of the display 19.

Central processing unit (CPU) 11 not only processes input data from the console panel 17, edit pad 15, and mouse 22, developments of the display memory 20, and outputs of display 19, but also checks the selected edit contents and sets the edit instructions to the IPS 26. Read only memory (ROM) 12 stores programs and data required to cause the CPU 11 to perform the above operations. ROM 12 is used as a work area for executing the programs, while Random access memory (RAM) 13 is used to store data under processing and other necessary data as the case may require.

An operation of setting an edit instruction and correcting an area is performed as follows.

An edit content is selected by operating keys on the console panel 17, and the selection data is transmitted to CPU 11 from a keyboard switch I/F (interface) 16. CPU 11, upon selection of the edit content, switches the processing mode to an input mode for its edit area and waits for a specification or input of the edit area from the edit pad 15. Since the edit area input data is sent to serial communication LSI 14 from the edit pad 15 through a communication line, CPU 11 not only writes such input data into RAM 13 on a CPU bus, but also develops display data of such edit area in the display memory 20. Further, CPU 11 causes display memory 20 to develop image data of a document, and if an already set edit area is instructed, the display memory 20 develops the edit content of such edit area at a position other than such edit area for a predetermined time period. Therefore, both the edit area and the edit content are developed over the image of the document so as to overlap one upon the other, and these images are displayed on the display 19 through display section I/F 18.

In this case, what is required on the display 19 is to only check the positional relationship between the document and the edit area, so that it goes without saying that no high a resolution is required. After the edit area has been checked on the display 19 and the edit instruction has been confirmed by the console panel 17 in this way, CPU 11 sets the edit instruction to IPS 26.

To correct a set edit area, a correction is instructed from the console panel 17, and the CPU 11 then displays a document and respective edit areas on the display 19. The selected area is displayed while distinguished from other areas by blinking, displaying in reverse, or the like. When the cursor is moved and clicked at an area by the operator using mouse 22, not only such clicked area is displayed as a newly selected area in a different displaying manner, but also its edit content is displayed at a corner of the screen for a predetermined time period. For example, the screen is divided into four segments, upper, lower, right, and left, and the edit content is displayed on a side opposite to that of the selected area; i.e., if the selected area is on the upper side, its edit content is displayed on the lower side and erased after the elapse of the predetermined time period.

What is important is that the edit content be checked when the area has been selected, so that the edit content may be discarded thereafter. Therefore, such data is erased from the screen of the display 19 after the elapse of the predetermined time period so as to prevent the screen from being complicated.

Once the area has been selected and the content has been checked, the operator handles the mouse 22 to correct the area. To correct the area, CPU 11 selects the corresponding content based on the position and mode of clicking the cursor. The correcting content is selected in the following way: if the cursor is clicked at a position in the middle of a side of the selected area, such side is moved outward or inward; if the cursor is clicked at a corner, such corner, including the two sides forming such corner, is moved; if the cursor is clicked at the center, the entire area is moved. After the selection, the area is moved by moving the cursor for correction. At the same time, a correction amount is displayed on the display (the character display) of the console panel 17 numerically. Therefore, the operator can check the corrected area by the change made on the area displayed while overlapped with the document on the screen of the display 19 as well as the value indicating the correction amount that is displayed on the display unit of the console panel 17.

Further, it may be so arranged that if the cursor is clicked twice, the area is copied to another position and that if the cursor is clicked three times, the area is erased. These functions may be employed not only to correct areas but also to set them.

FIGS. 3 (a) through 3 (i) are diagrams for explaining exemplary processing performed by the image processor. This is an example in which an edit content is displayed using a character display that is different from a bit map display for displaying edit positions. Reference numeral 31 designates a document; 32, a bit map display; and 33, a character display.

First, to give edit instructions, for example, a document 31 is placed on the edit pad as shown in FIG. 3 (a), and when such edit contents as closed area, painting, and blue are instructed at point a, a mark x is displayed at a position corresponding to point a on the bit map display 32 in accordance with these instructions. Edit contents such as closed area, painting, and red are similarly instructed at point b, while edit contents such as closed area, painting, and yellow are instructed at point c. Further, edit content such as color conversion from black to red is instructed for a character portion "SHARE BY COMPANY". Then, marks x are displayed at positions corresponding to points b and c on the bit map display 32 as shown in FIG. 3 (b), and a rectangular cursor is displayed at a position corresponding to the character portion "SHARE BY COMPANY".

Figure 3A:
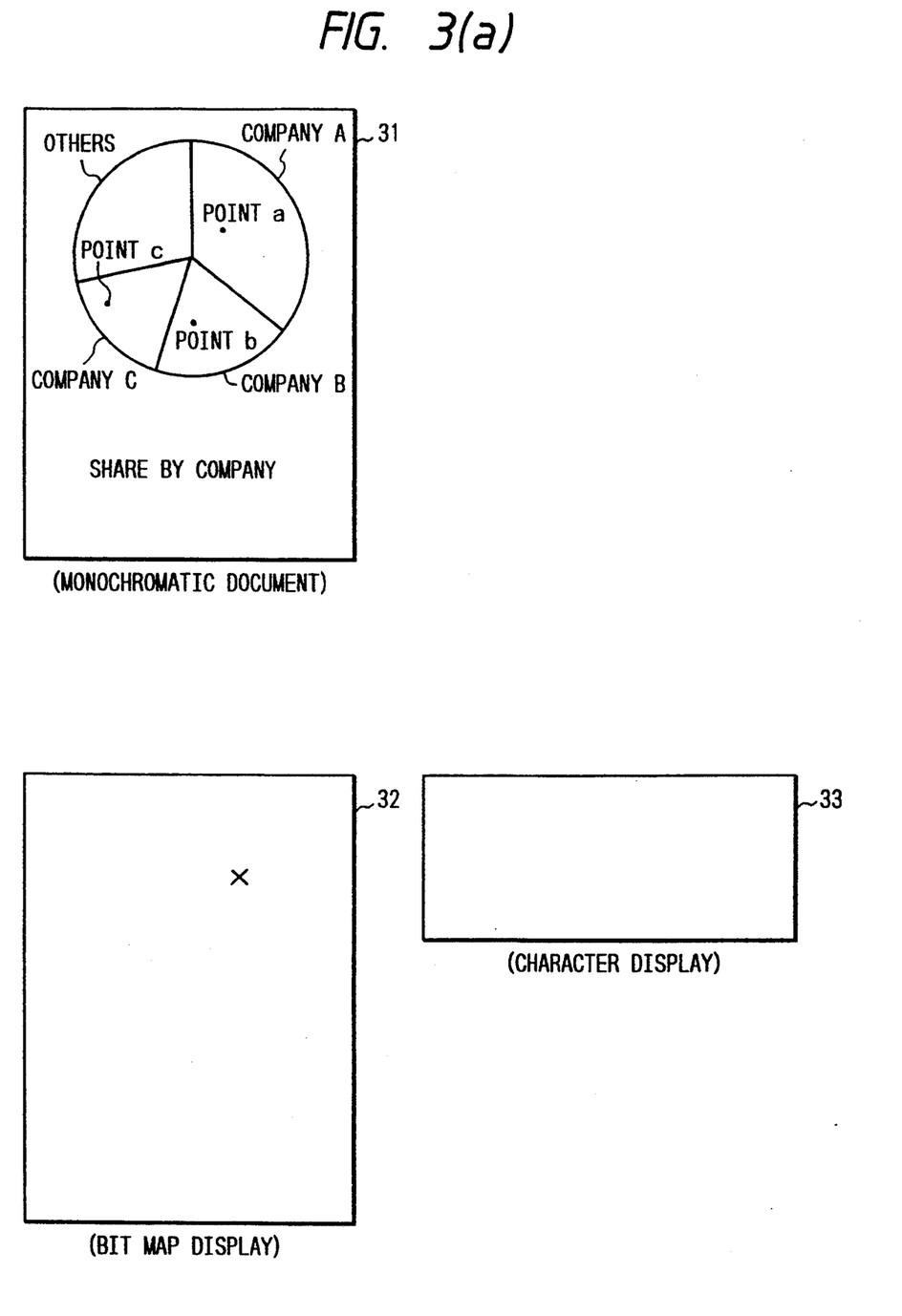
Figure 3B:
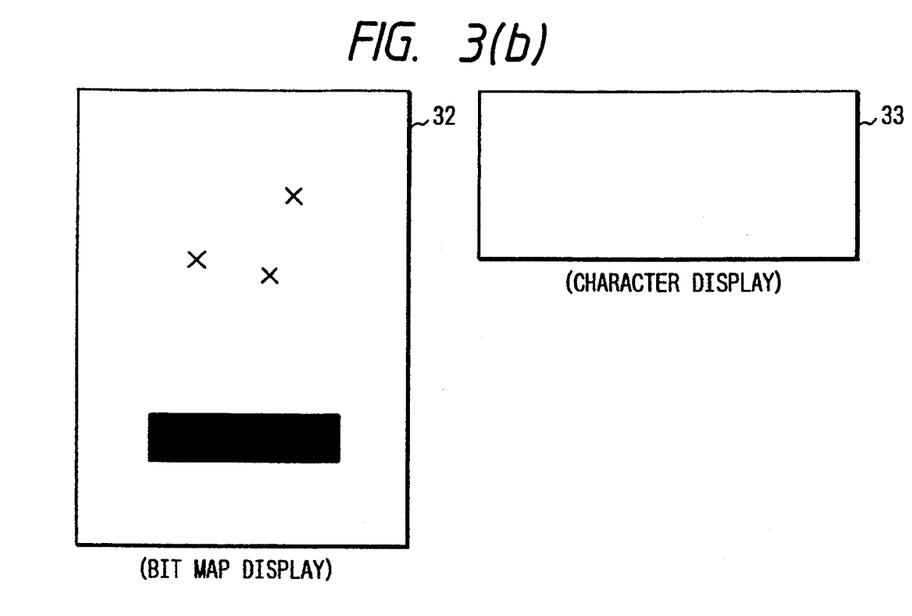
Figure 3C:
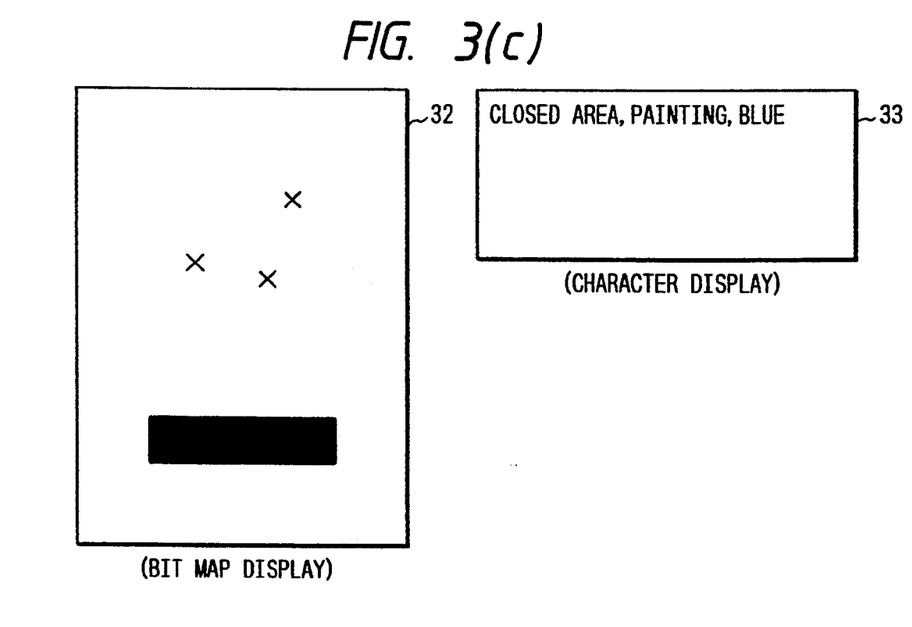
Figure 3D:
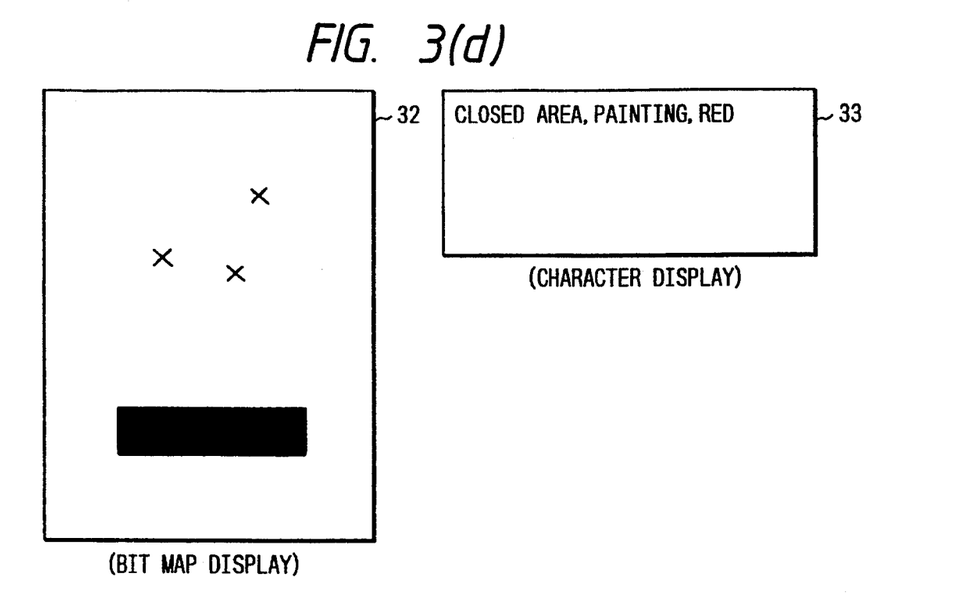
Figure 3E:
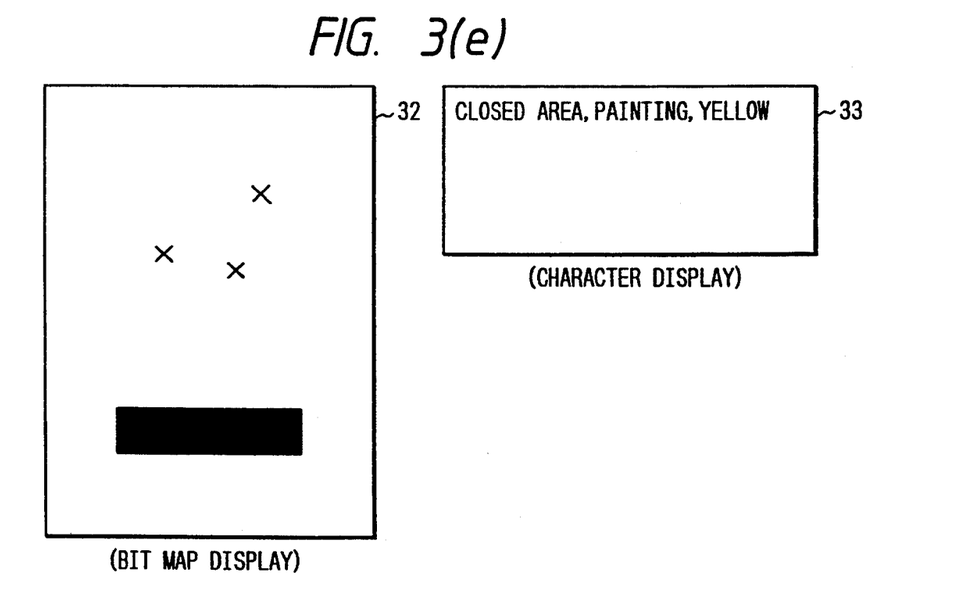
Figure 3F:
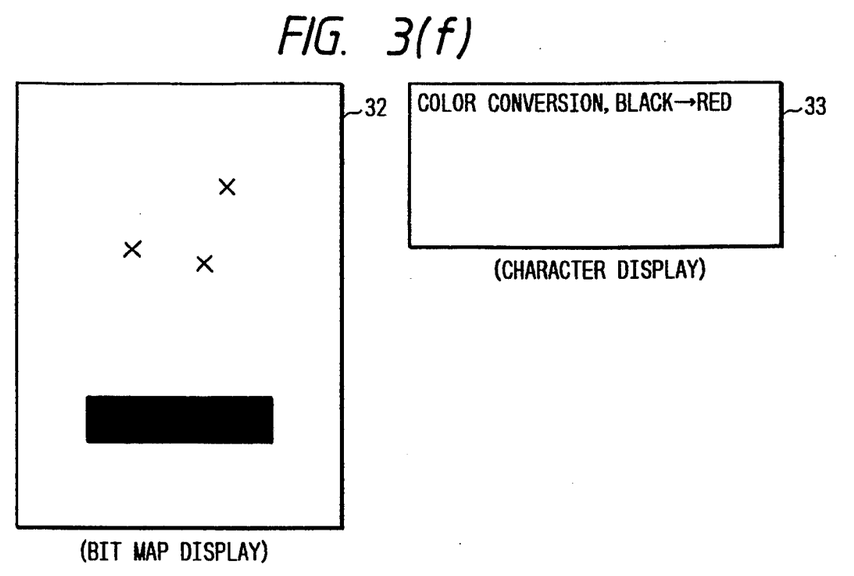
Figure 3G:
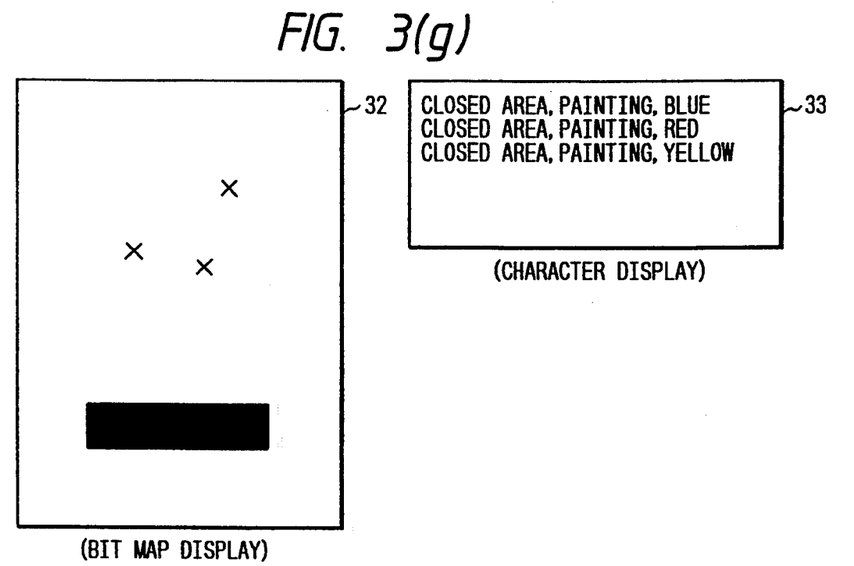
Figure 3H:
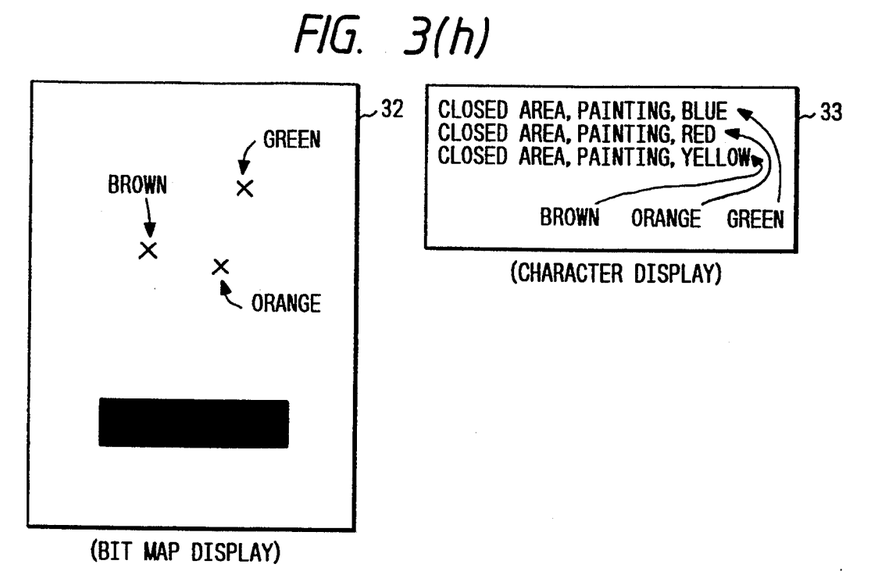
Figure 3I:
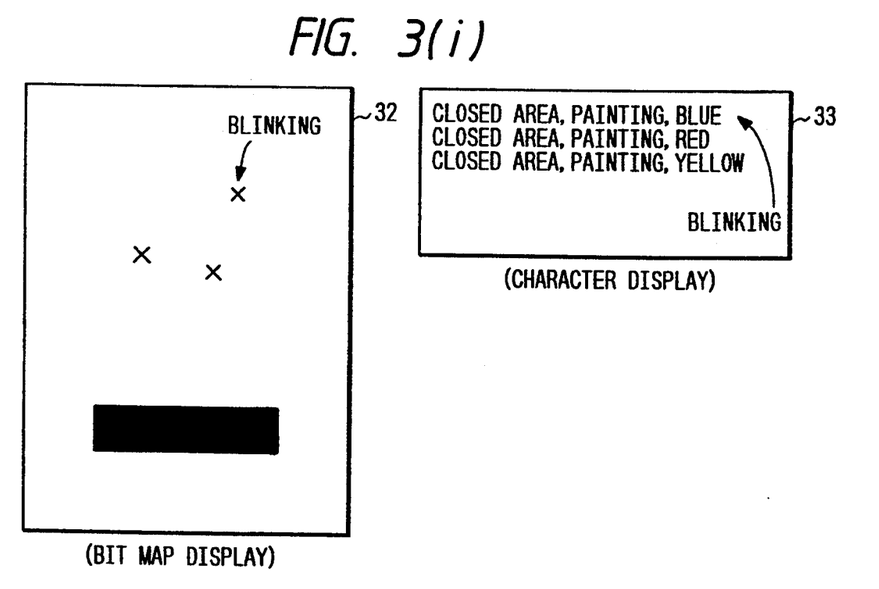

After a series of edit instructions have been given in the above way to complete a programmed input, a procedure start a copying operation is executed. To check the edit contents in the course of executing such procedure, an "edit check" button on the console panel is pressed, or the mark x at a position corresponding to, e.g., point a on the document is touched using the touch input panel on the bit map display 32.

By this operation, the edit contents "closed area, painting, and blue" for the area corresponding to the touched position are displayed on the character display 33 as shown in FIG. 3 (c).

Similarly, the edit contents are displayed on the character display 33 as shown in FIG. 3 (d) when the mark x corresponding to point b is touched, as shown in FIG. 3 (e) when the mark x corresponding to point c is touched, and as shown in FIG. 3 (f) when the rectangular cursor area corresponding to "SHARE BY COMPANY" is touched.

Further, as shown in FIG. 3 (g), the edit contents of the plurality of areas may be displayed on the character display 33 simultaneously. In this case, the correspondence between each edit area and each edit content is not clear. To overcome this problem, the marks x on the bit map display 32 may be displayed by color, with the edit contents displayed on the character display 33 by the corresponding color as shown in FIG. 3 (h), so that the correspondence between each edit area and each edit content can be recognized easily.

Furthermore, the displaying mode may be changed to distinguish one edit content from others in such a manner that a plurality of edit areas and their corresponding edit contents are displayed in advance, and that the only edit content of an edit area touched on the bit map display 32 is displayed by way of blinking on the character display 33 as shown in FIG. 3 (i).

The invention is not limited to the above embodiment, but may, of course, be modified in various ways. For example, while the above embodiment employs the technique of displaying by color or blinking to identify the correspondence between an edit area and its edit content at a glance when a plurality of edit areas and their corresponding edit contents are displayed simultaneously, other techniques such as displaying by blinking at a different cycle, in negative/positive inversion, and with different display attributes such as "o", "●", "Δ", "▲" and "+" may be adopted and they may be displayed, not at the center of the area, but at 4 corners, on diagonals, at upper right and lower left, or at upper left and lower right, or with a rectangular area. Further, while the edit areas and their edit contents are displayed using the bit map display 32 and character display 33, it may be so arranged that a single display is used to display the edit contents at an area where no edit areas are displayed, e.g., at upper and lower portions, right and left portions, and corners. Furthermore, while an edit content is erased automatically after the elapse of a predetermined time period, it may be so arranged that an operator instructs the erasure, or it goes without saying that the predetermined time period for automatic erasure may arbitrarily be selected by the operator. While the bit map display and the character display are employed in the above embodiment, other types of displays may also be used as long as a document and edit areas are displayed so as to overlap one upon the other with a low resolution and the positional relationship between the document and the edit areas can roughly be checked, or the document may be displayed in the form of binary-coded image, or the image of the document may be omitted by displaying such a grating with vertical and horizontal lines as to allow the positional relationship between the edit areas and the document to be roughly checked.

As is apparent from the foregoing description, the image processor of the invention displays both edit areas and their edit contents together with the document so as to correspond to each other, thereby allowing each edit area and its corresponding edit content to be checked easily. In addition, to correct or change an edit area and an edit content, correction errors caused by, e.g., a slip of memory can be prevented, which contributes to curtailing wasteful copies resulting from wrong edit instructions. Further, each edit area and its edit content are displayed by color, display attribute, or other display modes, so that the correspondence between an edit area and its edit content can be distinguished at a glance even if a plurality of edit areas and their edit contents are displayed simultaneously. Still further, the edit content that is displayed is automatically erased after the elapse of a predetermined time period, so that even if a plurality of display data are displayed, a sense of complexity felt about the screen that displays a lot of data is reduced.

What is claimed is:

1. An image processor having an edit function and outputting image data obtained by reading a document after subjecting the image data to an edit process, said image processor comprising:

image processing means for subjecting image data obtained by reading a document to an edit process and outputting edited image data;

input means for inputting edit instructions to said image processing means;

position developing means for developing positions corresponding to edit-instructed areas of said image data to be edited according to each of the respective edit instructions inputted by said input means; and first display means for displaying said image data and for displaying the positions developed by said position developing means with marks at positions corresponding to said edit-instructed areas of said image data, the developed positions being displayed in an overlapping manner with said image data.

2. The image processor according to claim 1, wherein said first display means displays each of the developed positions with a mark differing from one of said edit-instructed areas to another.

3. The image processor according to claim 1, wherein said first display means displays the developed positions in negative/positive inversion.

4. An image processor having an edit function and outputting image data obtained by reading a document after subjecting the image data to an edit process, said image processor comprising:

image processing means for subjecting image data obtained by reading a document to an edit process and outputting edited image data;

input means for inputting a plurality of edit instructions to said image processing means;

position developing means for developing positions corresponding to edit-instructed areas of said image data to be edited according to the edit instructions inputted by said input means;

content developing means for developing a content of each of the edit instructions inputted by said input means;

first display means for displaying said image data and for displaying the positions developed by said position developing means at positions corresponding to said edit-instructed areas of said image data; and second display means for displaying the content of each of the edit instructions developed by said content developing means.

5. The image processor according to claim 4, wherein the content of each of the edit instructions is displayed at a position different from the position of the edit-instructed areas on a single display screen.

6. The image processor according to claim 4, wherein the display of said content of each of the edit instructions is stopped after said content of each of the edit instructions has been displayed for a predetermined time period.

7. The image processor according to claim 4, wherein the position and content of each respective edit instruction are displayed with a single color, said color being changed for every one of the edit instructions.

* * * * *